United States Patent
Laitinen et al.

(10) Patent No.: US 8,543,814 B2
(45) Date of Patent: Sep. 24, 2013

(54) METHOD AND APPARATUS FOR USING GENERIC AUTHENTICATION ARCHITECTURE PROCEDURES IN PERSONAL COMPUTERS

(75) Inventors: Pekka Laitinen, Helsinki (FI); Shreekanth Lakshmeshwar, Espoo (FI)

(73) Assignee: RPX Corporation, San Francisco, CA (US)

(*) Notice: Subject to any disclaimer, the term of this patent is extended or adjusted under 35 U.S.C. 154(b) by 1129 days.

(21) Appl. No.: 11/328,155

(22) Filed: Jan. 10, 2006

(65) Prior Publication Data

US 2006/0218396 A1    Sep. 28, 2006

Related U.S. Application Data

(60) Provisional application No. 60/643,397, filed on Jan. 12, 2005, provisional application No. 60/646,847, filed on Jan. 12, 2005.

(51) Int. Cl.
H04L 29/06 (2006.01)

(52) U.S. Cl.
USPC ........... 713/167; 713/176; 713/162; 713/166; 713/168; 713/169; 713/171; 713/155; 726/4; 726/5

(58) Field of Classification Search
USPC ................. 713/176, 162, 166, 168, 169, 171, 713/155; 726/4, 5
See application file for complete search history.

(56) References Cited

U.S. PATENT DOCUMENTS

| | | |
|---|---|---|
| 2003/0087629 A1 | 5/2003 | Juitt et al. |
| 2004/0151317 A1* | 8/2004 | Hyyppa et al. .............. 380/277 |
| 2004/0158716 A1* | 8/2004 | Turtiainen et al. ........... 713/172 |
| 2005/0081066 A1 | 4/2005 | Lahdensivu et al. |
| 2005/0086467 A1* | 4/2005 | Asokan et al. ................ 713/155 |
| 2005/0102244 A1* | 5/2005 | Dickinson et al. ............. 705/74 |
| 2005/0287990 A1 | 12/2005 | Mononen et al. |
| 2005/0289341 A1* | 12/2005 | Ritola et al. .................. 713/168 |
| 2006/0075242 A1* | 4/2006 | Aissi et al. .................... 713/176 |
| 2006/0282882 A1* | 12/2006 | Bajko et al. ...................... 726/4 |

FOREIGN PATENT DOCUMENTS

WO    WO 02/15626 A1    2/2002

OTHER PUBLICATIONS

3GPP TS 33.220 v6.3.0, 3$^{rd}$ Generation Partnership Project; Technical Specification Group Services and System Aspects; Generic Authentication Architecture (GAA); Generic bootstrapping architecture (Release 6); Dec. 2004.

(Continued)

*Primary Examiner* — Patrick Edouard
*Assistant Examiner* — Shantell L Heiber
(74) *Attorney, Agent, or Firm* — Howison & Arnott, L.L.P.

(57) ABSTRACT

A method and apparatus for authenticating to a third party service provider from a personal computer. The method includes authenticating, with a mobile terminal, to the service provider with a universal subscriber identity module associated with the mobile terminal to obtain credentials specific to the service provider, transferring the credentials specific to the service provider from the mobile terminal to the personal computer, and accessing the service provider with the personal computer using the credentials transferred from the mobile terminal. The apparatus includes a mobile terminal, a computing device, a bootstrapping security module, and a network application function that cooperatively work to allow the computing device to access the network application function using a security credential from the mobile terminal.

28 Claims, 7 Drawing Sheets

(56) References Cited

OTHER PUBLICATIONS

3GPP TS 24.109 v7.1.0, 3$^{rd}$ Generation Partnership Project; Technical Specification Group Core Network and Terminals.

3GPP TR 33.919 v7.2.0, 3$^{rd}$ Generation Partnership Project; Technical Specification Group Services and System Aspects; 3G Security; Generic Authentication Architecture (GAA); System Description (Release 7); Mar. 2007.

3GPP TS 33.221 v6.4.0, 3$^{rd}$ Generation Partnership Project; Technical Specification Group Services and System Aspects; Generic Authentication Architecture (GAA); Support for subscriber certificates (Release 6); Jun. 2007.

\* cited by examiner

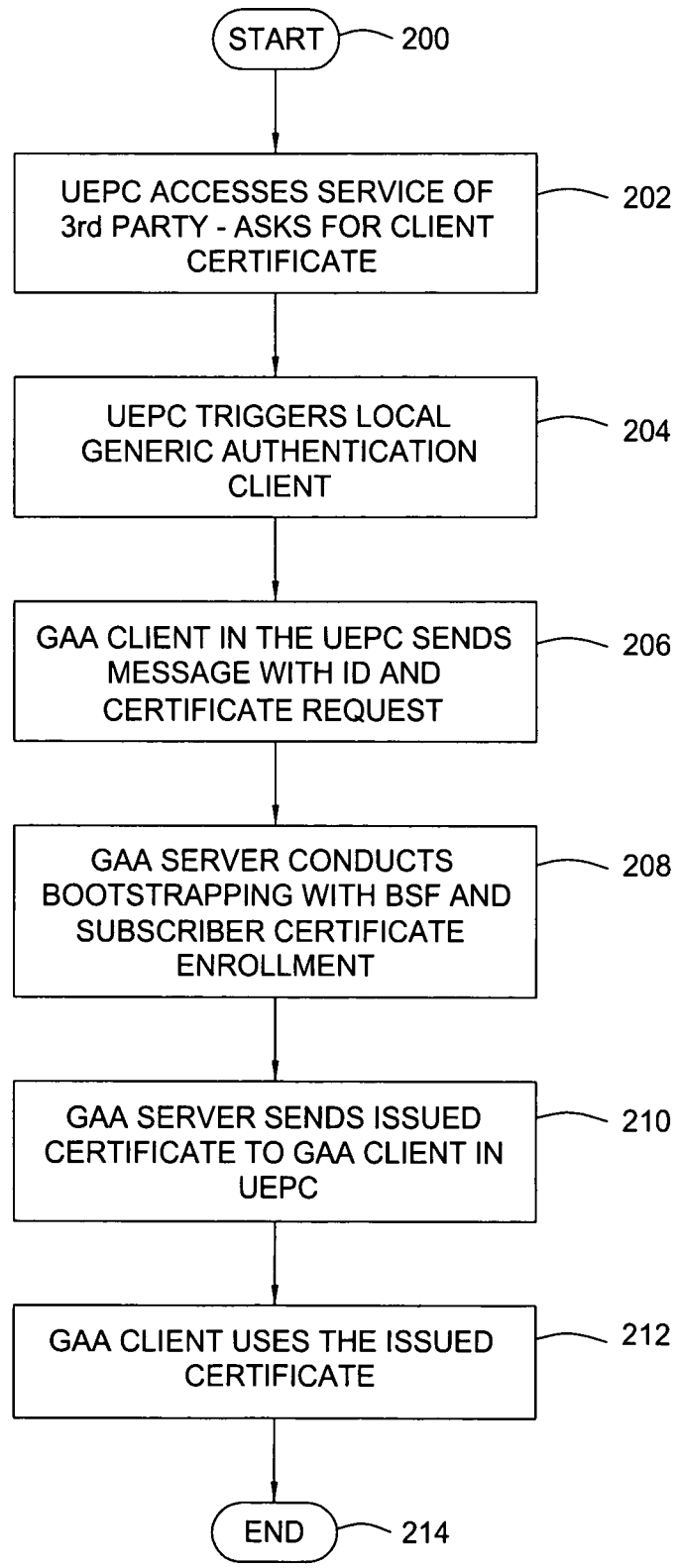

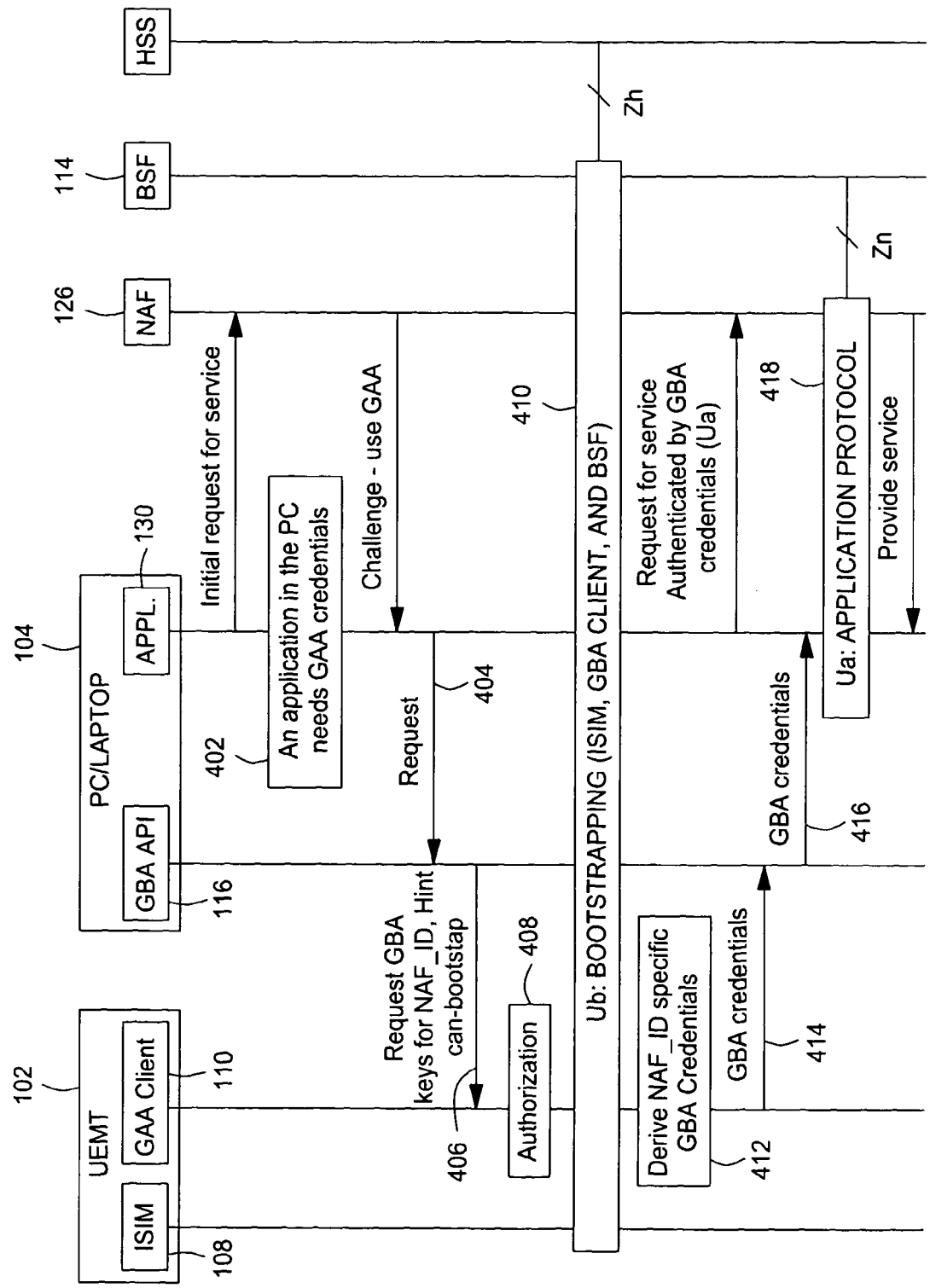

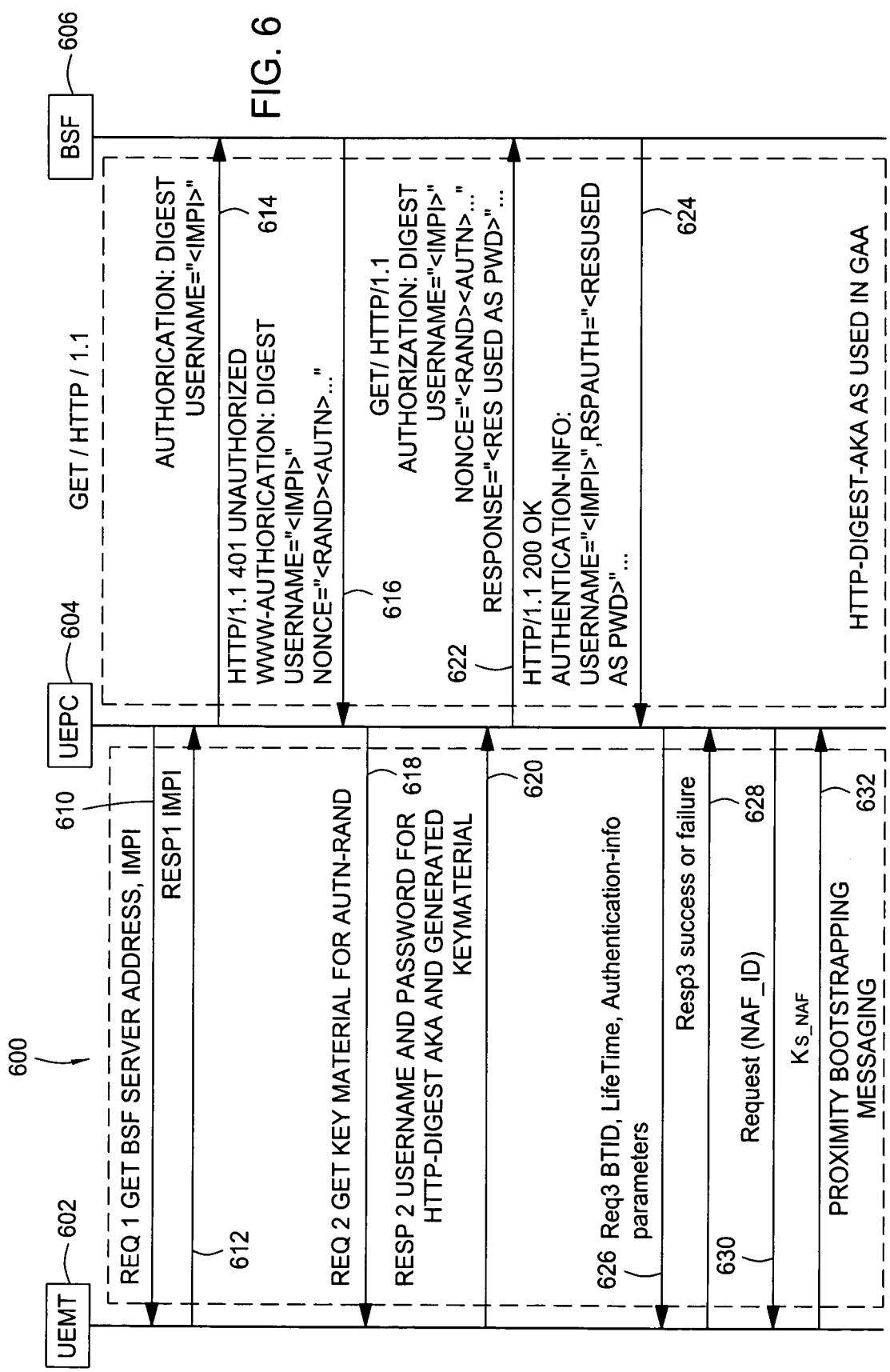

METHOD AND APPARATUS FOR USING GENERIC AUTHENTICATION ARCHITECTURE PROCEDURES IN PERSONAL COMPUTERS

CROSS REFERENCE TO RELATED APPLICATIONS

This application claims priority of U.S. Provisional Patent Application Ser. Nos. 60/643,397, filed on Jan. 12, 2005, and 60/646,847, filed on Jan. 12, 2005.

BACKGROUND OF THE INVENTION

1. Field of the Invention

This present invention relates to a method and apparatus for using mobile phone based generic authentication architecture credentials in personal computer environments.

2. Description of the Related Art

Universal subscriber identity module (USIM) based authentication is useful for many services, and in particular, where a user does not need to maintain passwords or certificates for client authentication. Shared keys using generic bootstrapping architecture (GBA), also known as GBA credentials, can be used in the mobile phone industry, and are useful for authenticating a mobile phone to network application functions (NAF). GBA generally includes the bootstrapping process, i.e., the establishment of a shared secret, while generic authentication architecture (GAA) includes both GBA and the usage of GBA credentials. As background, it would be helpful to refer to the Third Generation Participation Project (3GPP) specifications, such as 3GPP TS 33.220, 3GPP TS 24.109, and 3GPP TR 33.919 for additional description on the standards and specifications associated therewith. However, there are a large number of potential applications for this technology in the personal computer domain, and since it is generally convenient to use authentication-based services on personal computers, application of this technology to the personal computer domain is desirable.

Generally, if a user wants to use one set of GBA credentials for the same services on different devices, e.g., to use the authentication from a mobile phone for a personal computer, palm pilot, hand-held computer, or other electronic device, then there are two possibilities. The first possibility is to run GBA on the personal computer using a universal subscriber identity module placed in a smart card reader that is in communication with the computer. The second possibility is to run GBA on a mobile phone, and then transfer the GBA credentials from the mobile phone to the personal computer, where the GBA credentials will be used towards a network application function. The first option is difficult and generally impractical, as it requires the user to remove the universal subscriber identity module from the mobile phone and put the universal subscriber identity module into the personal computer. Although this may be possible for WCDMA (and SIMs of GSM devices), removal of a universal subscriber identity module from a first generation CDMA mobile device is generally not possible without substantial effort. This process would likely require not only redesign of the universal subscriber identity module for the mobile phone such that the module could be easily removed from the phone, but also, an interface for the removable universal subscriber identity module to communicate with the personal computer would also be required. As such, application of the first option is generally impractical and undesirable.

There have been other conventional proposals to use the split terminal configuration for GBA standardization. One implementation involves configuring a mobile phone to use an IP stack on a proximity interface like an infrared (IR) interface, a Bluetooth® connection, or a serial cable, that is connected to a personal computer, and the personal computer opens the Internet for the phone. However, this proposal presents challenges, in that the user would be required to know how to configure the stack setup for the mobile phone and the personal computer to make the proposal work properly.

Another possibility for a split terminal configuration setup would be to forward all of the bootstrapping messages from the mobile terminal to the personal computer, and then the personal computer would proxy the messages to the bootstrapping server function (BSF). This proposal, although simplistic in its explanation, has substantial implementation difficulties, as the mobile phone software and the personal computer operating system are highly organized, and as such, any modifications to this code or functionality requires substantial effort and presents a high likelihood of conflict with other operational characteristics of the respective devices.

The present invention addresses the problem of how GBA credentials could be used in a device that is not equipped with universal subscriber identity module (USIM), i.e., a device that is USIM less. Described herein is how third generation partnership project (3GPP) generic authentication architecture (GAA) could be used in a scenario where the user equipment has been split into two parts: first, mobile terminal that contains the universal subscriber identity module and GAA functionality; and second, a personal computer/laptop with applications that use GAA remotely for authentication purposes. This scenario is commonly referred to as the split terminal configuration.

Also described herein is how third generation partnership project (3GPP) generic authentication (GAA) could be used in a personal computer by passing the majority of the GAA functionality to the personal computer, so that the personal computer constructs the messages needed for HTTP-digest-AKA protocol that are used in generic authentication architecture bootstrapping.

Conventionally, there have been several mechanisms for authenticating to third party services from the personal computer environments. Some examples are combinations of usernames and passwords or personal identification numbers (PIN), secure Ids, client digital certificates, smart cards, etc. Some of these methods are generally weak from an authentication perspective, while some are relatively strong. Many of the methods and apparatuses that are strong in terms of authentication need either extra hardware (like smart card and a reader) or extra expenditure (client certificate needs to be bought). The alternative proposed by the present invention is much more cost effective and is a stronger authentication mechanism.

Once the supporting infrastructure for the 3GPP GAA is built and operational, then use of the credentials obtained for user equipment mobile terminals will be available for use in user equipment personal computers that are in a split terminal configuration with the user equipment mobile terminal.

SUMMARY OF THE INVENTION

The present invention discloses a mechanism for transferring GAA credentials to a user equipment personal computer (UEPC) from a user equipment mobile terminal (UEMT). The data transfer supporting this process generally occurs through a proximity interface, such as cable, infrared, Bluetooth®, etc. If the proximity communication channel is not based on cable, but based on some wireless methods, then the invention assumes that the channel is secured.

Embodiments of the invention generally provide a method for authenticating a user to a service provider from a personal computer. The method includes authenticating, with a mobile terminal, to the service provider with a universal subscriber identity module associated with the mobile terminal to obtain credentials specific to the service provider, transferring the credentials specific to the service provider from the mobile terminal to the personal computer, and accessing the service provider with the personal computer using the credentials transferred from the mobile terminal. In other embodiments of the invention, the GAA can provide mutual authentication, i.e., both the user/device and the service provider are authenticated.

Embodiments of the invention may further provide a method for authenticating a computing device to a network application function in a split terminal configuration. The method includes determining generic bootstrapping architecture (GBA) credentials are needed for an application running on the computing device, and requesting, by the application and through a generic bootstrapping architecture application programming interface (GBA API) that incorporates a wireless communication medium, the generic bootstrapping architecture credentials from a mobile terminal. The method further includes bootstrapping by the mobile terminal with a bootstrapping server function to establish the generic bootstrapping architecture credentials with the mobile terminal, transmitting the generic bootstrapping architecture credentials from the mobile terminal to the a generic bootstrapping architecture application programming interface, which transmits the generic bootstrapping architecture credentials to the application running on the computing device, and using, by the application running on the computing device, the bootstrapping architecture credentials. It is noted that the keys are established based on cellular communication Authentication and Key Agreement (AKA) between the mobile terminal and the BSF, however the AKA keys are generally not transmitted over an interface.

Embodiments of the invention may further provide an apparatus for authenticating a computing device to a network application function in a split terminal configuration. The apparatus generally includes a mobile terminal having a universal subscriber identity module and an application interface, the universal subscriber identity module being configured to contain a secret key (which is generated in the USIM, e.g., the authentication vector is generated from the secret key using input parameters RAND and AUTN), a computing device in communication with the mobile terminal, the computing device being configured to use a network application function that requires credentials, and a bootstrapping server function module in communication with the mobile terminal, the bootstrapping server function module being configured to generate and transmit the credentials specific to the network application function to the mobile terminal upon receiving a request for credentials from the mobile terminal. Further, the mobile terminal is configured to transfer the credentials to the computing device for use in accessing the network application function.

Embodiments of the invention may further provide an apparatus for authenticating a computing device to a network application function in a split terminal configuration. The apparatus generally includes means for determining generic bootstrapping architecture credentials are needed for an application running on the computing device and requesting, by the application and through a generic bootstrapping architecture application programming interface that incorporates a wireless communication medium, the generic bootstrapping architecture credentials from a mobile terminal, means for bootstrapping the mobile terminal with a bootstrapping server function to obtain the bootstrapping architecture credentials, which are transmitted back to the mobile terminal and then to the application running on the computing device, and means for processing, by the application running on the computing device, the generic bootstrapping architecture credentials to run the application.

BRIEF DESCRIPTION OF THE DRAWINGS

For proper understanding of the invention, reference should be made to the accompanying drawings, wherein:

FIG. 2 illustrates a flowchart of an exemplary method for transferring generic bootstrapping architecture credentials to get a subscriber certificate for a user equipment personal computer;

FIG. 5 illustrates a request flow diagram for an exemplary method for generic authentication architecture based authentication in a split terminal configuration; and FIG. 6 illustrates an exemplary messaging protocol for an embodiment of the invention.

DETAILED DESCRIPTION OF THE PREFERRED EMBODIMENT(S)

Figure 1:
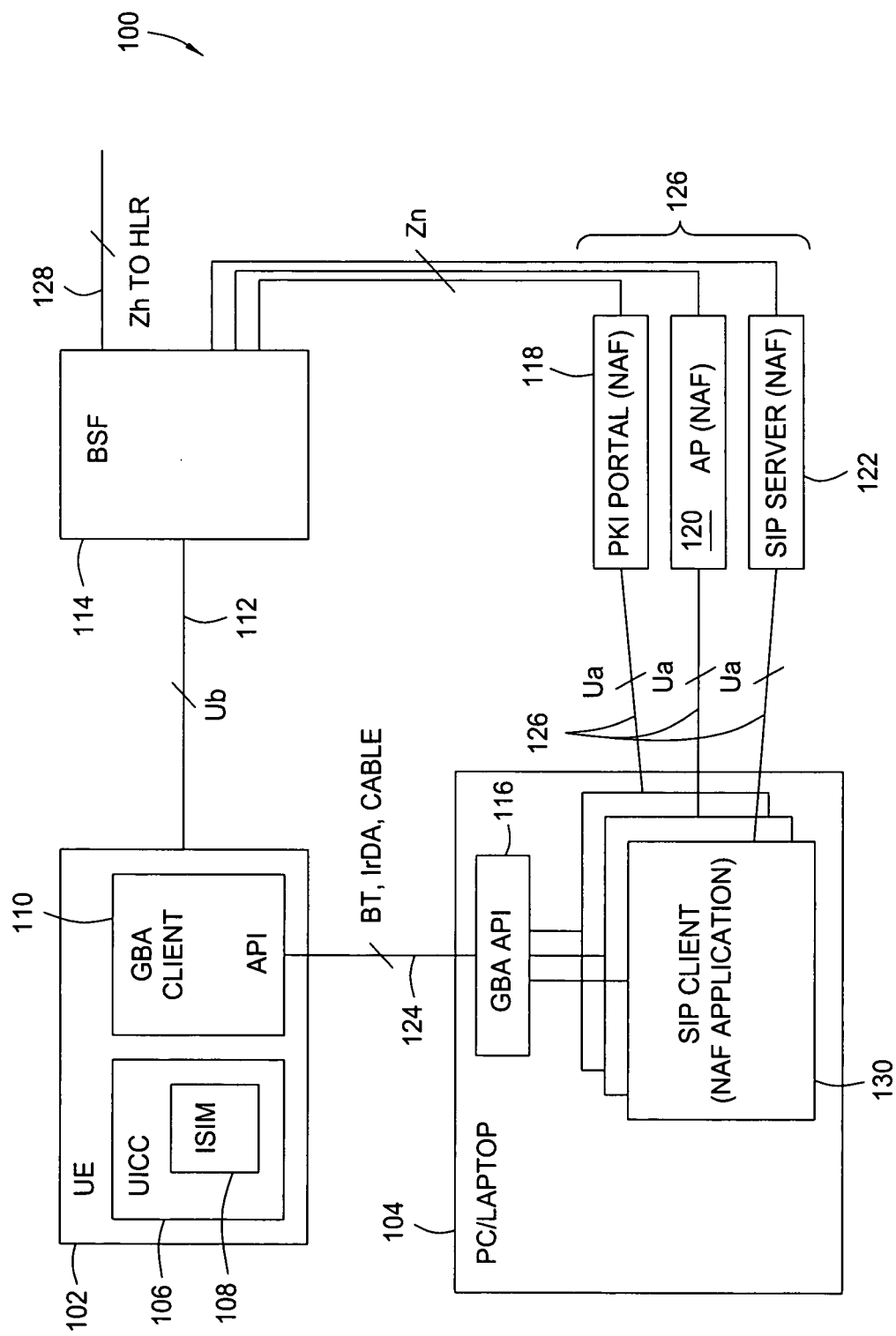
FIG. 1 illustrates an exemplary split terminal hardware configuration for an embodiment of the invention using third generation participation project generic authentication usage.

The present invention discloses a mechanism for transferring network application function specific GBA credentials in the split terminal configuration to a user equipment personal computer (UEPC) from a user equipment mobile terminal (UEMT). The data transfer supporting this process generally occurs through a proximity interface, such as hard wired cable, infrared connection, Bluetooth® connection, etc. If the proximity communication channel is not based on a hard wired cable, but rather, based on a wireless method, then the invention assumes that the wireless communication channel is secured.

The third generation participation project (3GPP) generic authentication architecture (GAA) has been standardized and will be deployed soon. This infrastructure generally includes user equipment (UE) authenticating to a service provider, which is generally called a network application function (Network Application Function) in GAA, based on an identity module, which in this case is generally the user universal subscriber identity module (USIM) that is in the user equipment. For embodiments of the present invention, an identity module is generally defined as a USIM, a SIM, or any other identity module known in the art. For example, although the generic bootstrapping architecture functions may be accomplished via a universal subscriber identity module, they may also be accomplished with a SIM, UIM, or other identity module known in the art. In the third generation participation project generic authentication architecture, the generic bootstrapping architecture can also be based on IMS subscriber identity module (ISIM), or existing subscriber identify module (SIM) for GSM. In this process, first, generally the user equipment runs HTTP-Digest-AKA protocol with bootstrapping server function (bootstrapping server function) using universal subscriber identity module for authentication. This process results in secure derivation of GBA credentials. The GBA credentials are generally in the form of a username (BTID) and a master password (Ks). The master password is used multiple times to derive network application function specific generic bootstrapping architecture credentials (Ks_NAF). It is also possible to derive more network application function specific generic bootstrapping architecture credentials, such as the master password (Ks). These credentials are then used for mutual authentication of the user equipment and the particular network application function.

Embodiments of the invention propose two general components for transferring network application function credentials (BTID and Ks_NAF) to a user equipment personal computer from a user equipment mobile terminal: first, a generic authentication server running on the user equipment mobile terminal; and second, a generic authentication client is running in the user equipment personal computer. The generic authentication client in the user equipment personal computer communicates with the generic authentication server in the user equipment mobile terminal using the above mentioned secure proximity or hard wired channel.

FIG. 1 illustrates an exemplary split terminal hardware configuration 100 for an embodiment of the invention used in conjunction with third generation participation project generic authentication architecture. The split terminal hardware configuration 100 is divided into two primary components: first, user equipment 102, which may be a mobile terminal, mobile phone, or other handheld communication device; and second, a personal computer 104, which may be a desktop computer, a laptop computer that generally include wireless communication capabilities, or another computing device. The user equipment 102 generally contains a smart card 106 (UICC) that has a universal subscriber identity module (USIM) 108 and an application (generic bootstrapping architecture client) 110 that is responsible for running a bootstrapping procedure with the bootstrapping server function (BSF) 114 over the reference point (Ub) 112, and providing a service over a local connection, which may be a Bluetooth® connection, infrared connection, or a conventional cable-type connection, to the personal computer 104. The laptop in turn contains a generic bootstrapping architecture (GBA) application programming interface (API) 116, which utilizes a service provided by the generic bootstrapping architecture application 110 in the user equipment, and any other type of application that uses the generic bootstrapping architecture credentials through the generic bootstrapping architecture application programming interface 116 when authenticating towards a service in a network.

The services illustrated in FIG. 1 are only examples and include public key infrastructure (PKI) portal 118, authentication proxy 120 (AP), and session initiation protocol (SIP) server 122 services. Other possible services may be Liberty's identity provider (IdP), and presence list server for managing a subscriber's presence lists. The services can function as a network application function (NAF) 126 of generic authentication architecture.

The generic bootstrapping architecture client 110 in the user equipment 102 communicates both with the universal subscriber identity module 108 in the smart card 106, and with the bootstrapping server function 114 over the reference point Ub 112. The generic bootstrapping architecture client 110 also offers a generic bootstrapping architecture application programming interface both on the user equipment and to the generic bootstrapping architecture application program interface that resides in the user equipment personal computer. The basic functionality of this application program interface is to enable applications, both in the user equipment 102 and in the user equipment personal computer 104, to request generic bootstrapping architecture credentials that have been derived from the bootstrapping session that has been established over the reference point 112.

The generic bootstrapping architecture application programming interface 116 in the user equipment personal computer 104 communicates with the generic bootstrapping architecture client 110 in the mobile phone or user equipment 102 over a local connection 124. This connection is used to request generic bootstrapping architecture credentials by applications that want to use them in an authentication process with a server that supports the generic bootstrapping architecture, i.e., towards an NAF. For example, in a Windows® environment, the generic bootstrapping architecture application programming interface could be a service, for example The generic bootstrapping architecture credentials generally include a bootstrapping transaction identifier (B-TID) and a network application function specific shared secret (Ks_NAF) that are the result of the bootstrapping session between the user equipment 102 and the bootstrapping server function 114. The generic bootstrapping architecture credentials may generally be used between any generic authentication architecture enabled application to secure and protect the communication traffic between a user equipment and a network application function across the reference point 126 (Ua), for example. The most straightforward way to use the generic bootstrapping architecture credentials is to use them as a username (the B-TID), and a password (the Ks_NAF), but they can be used anyway the network application function 130 application and the network application function server 126 prefers in the reference point Ua.

Figure 4:
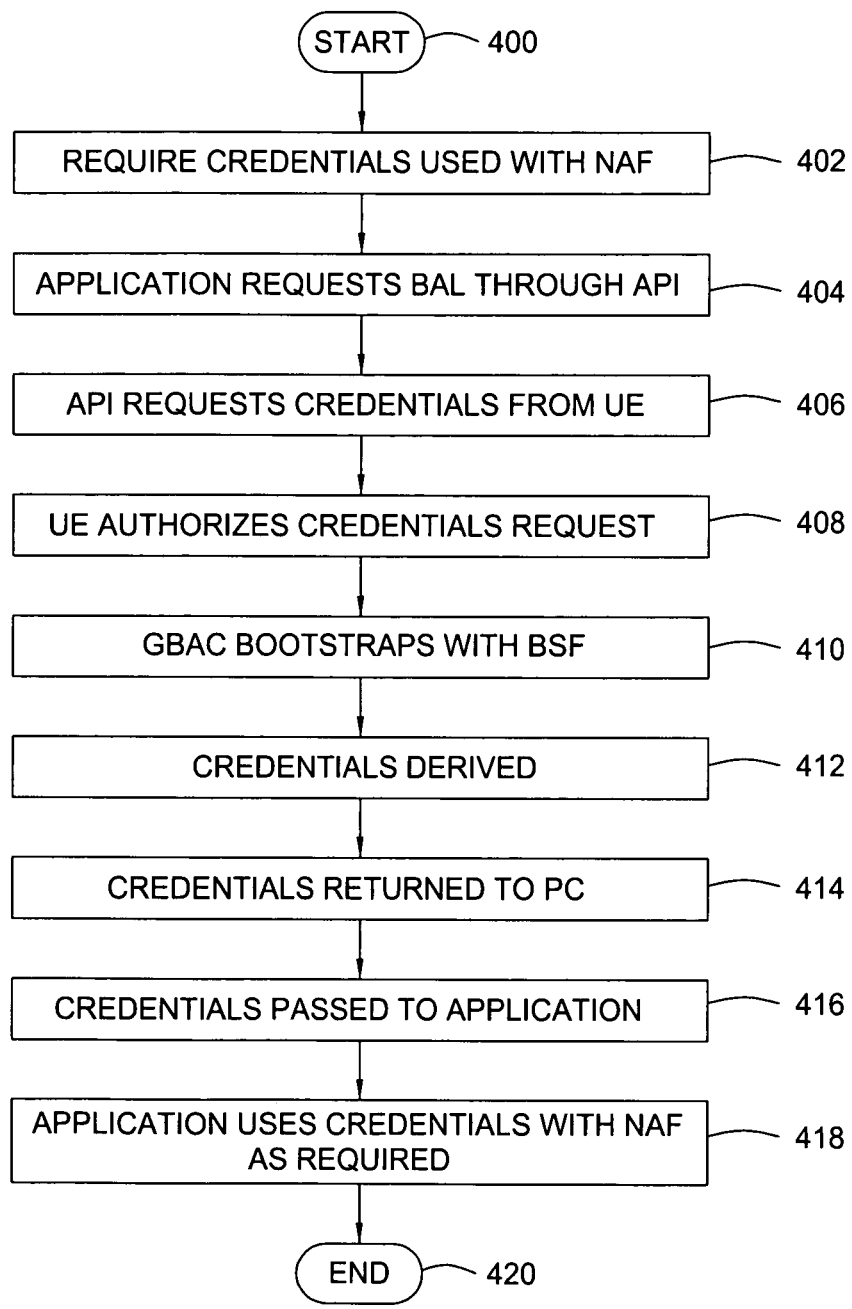
FIG. 4 illustrates a flowchart of an exemplary method for generic authentication architecture based authentication in a split terminal configuration.

FIGS. 4 and 5 cooperatively illustrate a flowchart of an exemplary method for generic authentication in a split terminal configuration. The method begins at step 400 and continues to step 402, where an application 130 in the personal computer/laptop (user equipment personal computer) 104 requires the generic bootstrapping architecture credentials to be used with an application server, i.e., a network application function 126. The need for generic bootstrapping architecture credentials in the application is either indicated by the application server (network application function 126) or explicitly known by the application itself, e.g., pre-configured. Thereafter, at step 404, the application requests generic bootstrapping architecture credentials through the generic bootstrapping architecture application programming interface 116. At step 406, the generic bootstrapping architecture application programming interface 116 uses a local connection 124 to request generic bootstrapping architecture credentials from the generic bootstrapping architecture client 110 in the user equipment 102. At step 408, the generic bootstrapping architecture client 110 in the user equipment 102 authorizes the generic bootstrapping architecture credential request from the user equipment personal computer 104. The authorization may be accomplished, for example, by prompting the user for an approval, i.e., the same way as personal firewall applications generally prompt for a user to approve actions requested by an application, such as to open a connection to a server or to open a server socket. This provides a layer of security to the user equipment, as the user has the opportunity to decline any requests for credential sharing that are not wanted.

If the generic bootstrapping architecture credential request was approved in step 408, then the generic bootstrapping architecture client 110 will bootstrap with the bootstrapping server function 114 to establish a new bootstrapping session (BTID, Ks) at step 410, if there was no pre-existing bootstrapping session. In this step, the bootstrapping server function 114 contacts the home location register (HLR) or the home subscriber system (HSS) over reference point 128 (Zh), which is generally a high speed serial interface, during the bootstrapping procedure. If the generic bootstrapping architecture client 110 already has a bootstrapping session, then it may reuse the previous session GBA credentials. The generic bootstrapping architecture client 110 (referred to as GBAC in step 410) will then derive the network application function specific generic bootstrapping architecture credentials (BTID, Ks_NAF) for the bootstrapping session at step 412. The generic bootstrapping architecture client 110 returns the network application function specific generic bootstrapping architecture credentials to the generic bootstrapping architecture application programming interface 116 over the local connection 124 at step 414. The generic bootstrapping architecture application programming interface 116 gives the generic bootstrapping architecture credentials to the application 130 in the user equipment personal computer 104 at step 416. The application 130 then uses the generic bootstrapping architecture credentials with a network application function 126 anyway it chooses at step 418. Some example applications 130 in the user equipment personal computers 104 using generic bootstrapping architecture credentials could be common browser applications, such as MS Internet Explorer®, Opera®, Firefox®, etc., EAP implementation (for EAP/MD5 or EAP/TLS), SIP clients, etc. The method ends at step 420.

The split terminal configuration is more secure than other alternatives where the personal computer 104 itself would implement the bootstrapping, i.e., the authentication key agreement (AKA) related procedures. In the split terminal configuration, only the network application function specific generic bootstrapping architecture credentials (BTID, Ks_NAF) are given to the personal computer 104. If the personal computer 104 would implement the authentication key agreement related procedures itself i.e., HTTP Digest AKA or EAP/AKA, then the authentication vector would have to be given to the personal computer 104 and the bootstrapping session data (BTID, Ks) would be established in the personal computer 104, which is not recommended. The split terminal configuration enables mobile network operators to control the services that are used from the personal computer 104 environment, as the generic authentication architecture is used. Also, generic authentication architecture usage in the split terminal configuration can harmonize the application server, i.e., the NAF server, functionality, as generic authentication architecture will be used both from the user equipment or mobile terminal 102 and from the personal computer 104 environments.

The generic bootstrapping architecture credentials can also be used in different scenarios. For example, within Extensible Authentication Protocol EAP/MD5 (MD5 is generally known as a one-way hash function, meaning that it takes a message and converts it into a fixed string of digits, also called a message digest) and IP Security/Internet Key Exchange (a set of protocols developed by the IETF to support secure exchange of packets at the IP layer—IPsec/IKE), the generic bootstrapping architecture credentials can be used as a username/password. With HTTP based protocols, the generic bootstrapping architecture credentials can be used in several ways: transport layer security (TLS) with HTTP Digest, or with shared key TLS (which could also be used in EAP/TLS). Furthermore, as generic authentication architecture specifies a way to enroll client certificates in the third generation participation project, where the authentication of the enrollment is based on generic authentication architecture. Thus, also public key infrastructure methods can be used establish secure connections between the personal computers/laptop, and an application server.

Figure 3A:
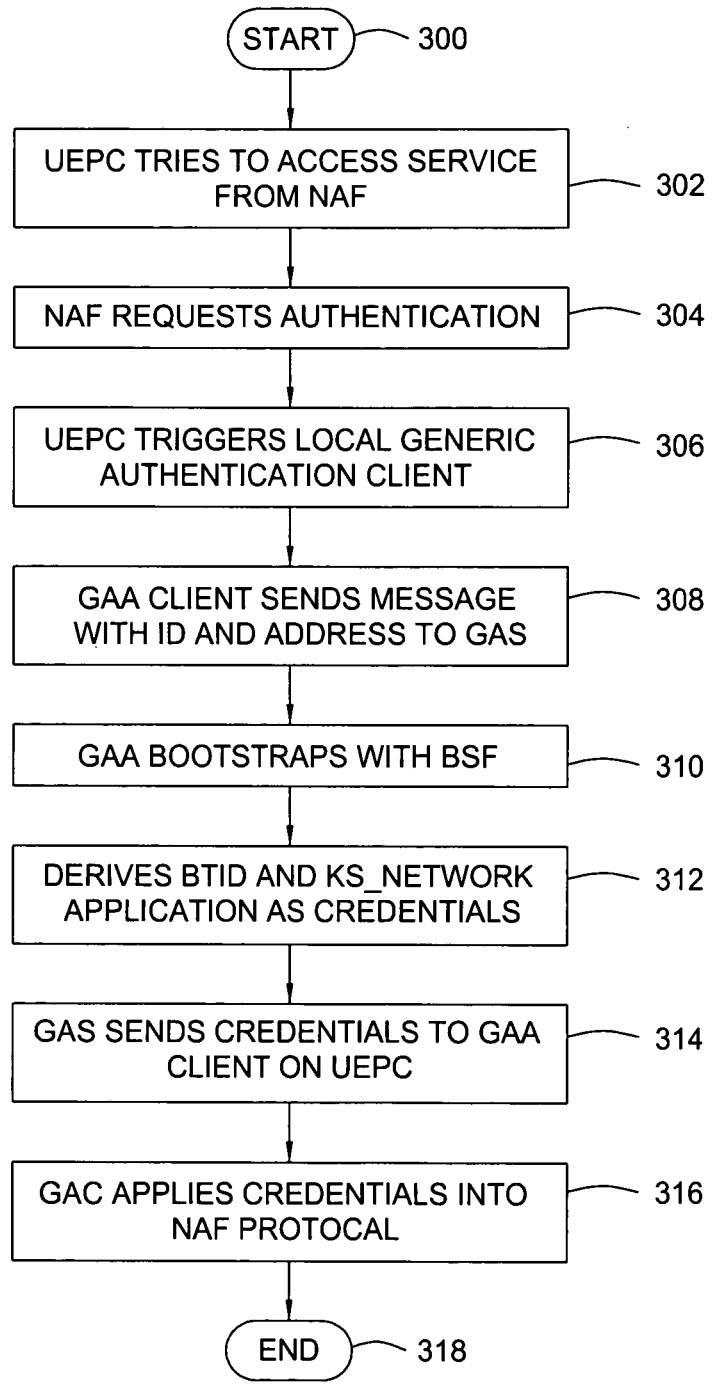
FIG. 3A illustrates an exemplary flowchart of steps that are completed when the user equipment personal computer wants to authenticate to a network application function in an embodiment of the invention.

In another embodiment of the invention, the steps that are completed when the user equipment personal computer 104 wants to authenticate to a network application function 126 are shown in FIG. 3A. The method begins at step 300 and at step 302 the user equipment personal computer 104 tries to access the service provided by the network application function. The network application function then requests authentication from the user equipment personal computer 104 at step 304. The authentication mechanism may be http-digest, TLS, SASL, or another known authentication mechanism compatible with the present invention. At step 306, the user equipment personal computer triggers the local generic authentication architecture client, which starts fetching new valid credentials from the user equipment mobile terminal. At step 308, the generic authentication architecture client in the user equipment personal computer 104 sends a message containing an NAF identifier. At step 310, the generic authentication architecture server starts bootstrapping (Ub) communication with the bootstrapping server function 114. The bootstrapping server function server address is generally pre-configured or derived from the interoperable message passing interface (IMPI). In this phase, the universal subscriber identity module authentication using authentication and key agreement (AKA) is carried out. Also, this bootstrapping mechanism then derives a BTID (a username) and a Ks (a master password) as GBA credentials. At step 312, the generic authentication architecture server derives the network application specific GBA credentials (Ks_NAF). At step 314, the generic authentication architecture server sends the network application function specific GBA credentials (BTID, Ks_NAF) to generic authentication architecture client 130 in the user equipment personal computer 104 in the response. At step 316, the generic authentication architecture client 130 then applies these credentials into the network application function 126 specific authentication protocol properly, and the method generally ends at step 318.

The generic bootstrapping architecture credentials themselves generally have a finite lifetime, and hence, it is possible to store and re-use the credentials during their lifetime. As such, in steps 306 and 310, a check may be done to determine if a valid GBA credential already exists for the particular network application function. If a valid GBA credential is determined to exist, the existing credentials may be used instead of deriving new ones in the following steps of the method, i.e., in this situation, the method would skip from step 306 to step 318. However, if the network application function does not accept or authorize the previously valid GBA credentials, then the network application function may require new GBA credentials, in which case, the old credentials may be deleted and new generic authentication credentials are generated and stored.

Figure 3B:
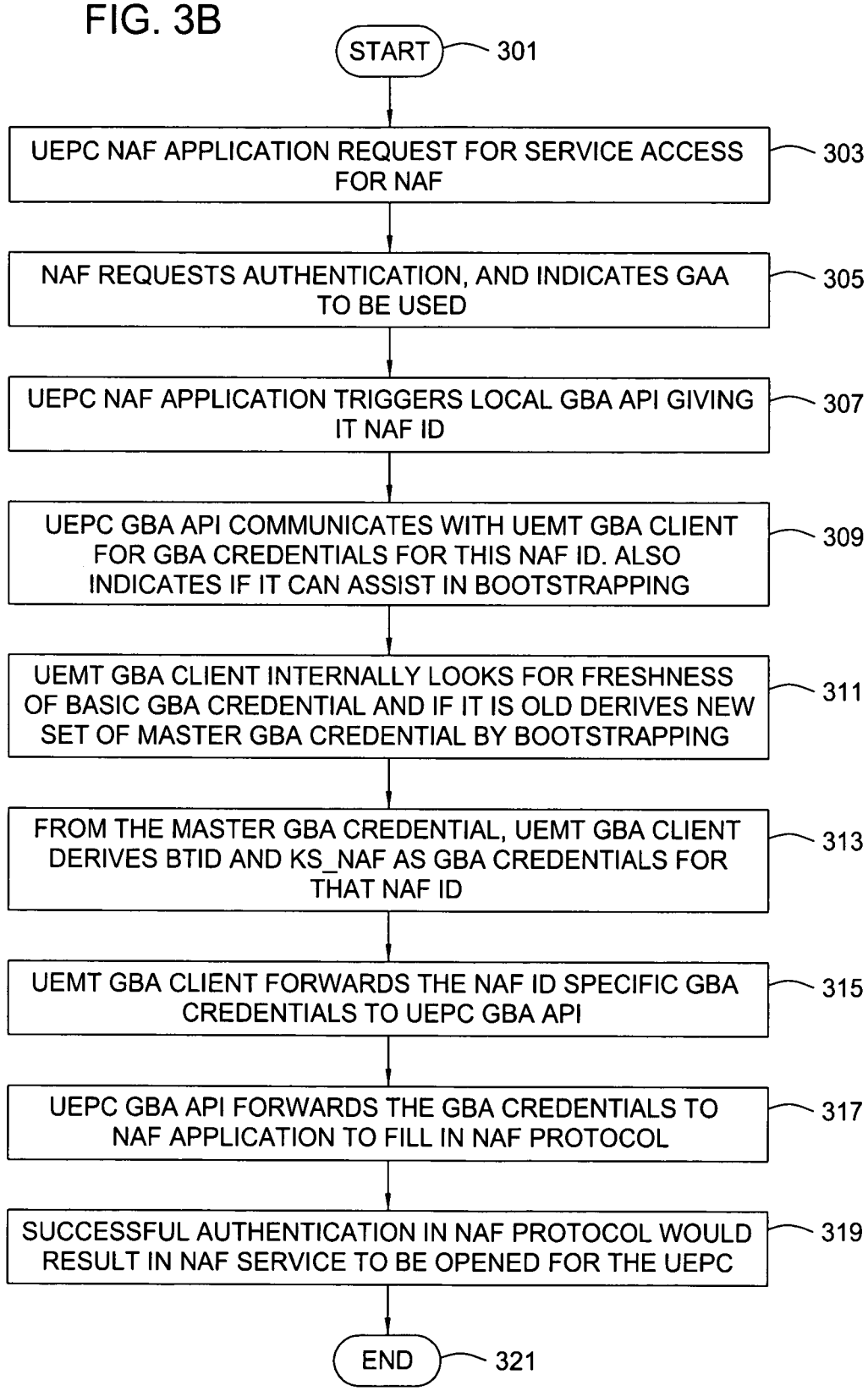
FIG. 3B illustrates an exemplary flowchart of steps that are completed when the user equipment personal computer wants to authenticate to a network application function in an alternative embodiment of the invention

In another embodiment of the invention, the steps that are completed when the user equipment personal computer 104 wants to authenticate to a network application function 126 are shown in FIG. 3B. The method begins at step 301 and continues to step 303, where the user equipment personal computer requests service access for the network application function. The method then continues to step 305, wherein the network application function requests authentication from the user equipment personal computer and indicates the generic authentication architecture to be used. The method then continues to step 307, where the user equipment personal computer network application function triggers the local generic bootstrapping architecture application programming interface giving it the network application function identifier. Thereafter, the method continues to step 309, where the user equipment personal computer generic bootstrapping architecture application programming interface communicates with the user equipment mobile terminal generic bootstrapping architecture client for generic bootstrapping architecture credentials corresponding to the network application function identifier. Thereafter, the method continues to step 311, where the user equipment mobile terminal generic bootstrapping architecture client internally looks for freshness of basic generic bootstrapping architecture credentials, and if the credentials are old, then it derives a new set of master generic bootstrapping architecture credentials (B-TID, Ks) through bootstrapping. The method then continues to step 313, where the master generic bootstrapping architecture credential (Ks), the user equipment mobile terminal generic bootstrapping architecture client derives the network application function specific generic bootstrapping architecture specific credentials (Ks_NAF) for the particular network application function identifier. The method continues to step 315, where the user equipment mobile terminal generic bootstrapping architecture client forwards the network application function specific generic bootstrapping architecture credentials to the user equipment personal computer generic bootstrapping architecture application programming interface. The user equipment personal computer generic bootstrapping architecture application programming interface then forwards the generic bootstrapping architecture credentials to the network application function application to fill in the network application function protocol at step 317. Thereafter, successful authentication in the network application function protocol will result in network application function service being opened in the user equipment personal computer at step 319, and the method ends at step 321.

In another embodiment of the invention, generic authentication architecture also specifies how to issue a subscriber certificate using generic bootstrapping architecture credentials. Generally, the subscriber certificate is issued by a public key infrastructure (PKI) portal, which works as a network application function. However, the above described method for transferring the generic authentication credentials could also be used to authenticate a certificate enrolment request, i.e., get a subscriber certificate for a user equipment personal computer 104 generated PKCS10 request. FIG. 2 illustrates a flowchart of an exemplary method for transferring generic bootstrapping architecture credentials to get a subscriber certificate for a user equipment personal computer 104. The method begins at step 200 and continues to step 202, where a user equipment personal computer 104 tries to access a service provided by a third party and this party asks for a client certificate either for authentication, authorizing, or accounting purposes. At step 204, the user equipment personal computer 104 triggers the local generic authentication architecture client, which generates a new PKCS10 request. At step 206, the generic authentication architecture client in 130 the user equipment personal computer 104 sends a message containing an optional id for subscriber certificate issue and the PKCS10 request to the user equipment mobile terminal 102. At step 208, the generic authentication server conducts a bootstrapping process with the bootstrapping server function and generates GBA security credentials for public key infrastructure portal, which functions as the network application function. The bootstrapping server function 114 server address is generally pre-configured or derived from the IMPI of the universal subscriber identity module and the public key infrastructure portal address is pre-configured. The credentials are used to authenticate the certification request, i.e., PKCS10 request, to public key infrastructure portal and then a subscriber certificate is issued for the PKCS10 request. The method then continues to step 210, where the generic authentication architecture server sends the issued certificate to the generic authentication architecture client in the user equipment personal computer 104 in a response message. Thereafter, at step 212, the generic authentication architecture client uses the subscriber certificate, and the method ends at step 214.

In another embodiment of the invention, a CA or root certificate is obtained in a trusted way. The process of obtaining a CA certificate in a trusted way may be conducted in the same manner or sequence of steps as described above with respect to FIG. 2 and the subscriber certificate. The procedures for issuing a subscriber certificate and obtaining a CA or root certificate are described in 3GPP TS 33.221 and TS 24.109.

In another embodiment of the invention, whenever the generic authentication architecture server in user equipment mobile terminal performs actions or tasks for the user equipment personal computer, the generic authentication service generally requests user permission. There could also be a situation where a user could accept once, and for each instance after the acceptance, the generic authentication architecture server may implicitly assume the user's acceptance. These types of dialogues generally act as a security measure when there is a possibility of a virus in the user equipment personal computer trying to get the generic authentication credentials or some other device in the proximity network trying to access the generic authentication credentials.

In this embodiment of the invention, two implementations may be required. First, a generic authentication architecture client 110 at the user equipment mobile terminal 102, and second, a generic authentication architecture application programming interface 116 in the user equipment personal computer 104. The implementation is generally operating system and development environment specific, and as such, direct implementation of this specification is likely the most efficient method. This implementation allows the universal subscriber identity module generated authentication vectors to never leave the user equipment mobile terminal in their original form. With this protocol, any application in the user equipment personal computer can take advantage of very well defined generic authentication mechanisms. The type of implementation in this embodiment of the invention opens up wide opportunities to service providers.

In another embodiment of the invention, a mobile terminal is used in similar fashion to a smartcard reader. In this embodiment, the majority of the generic authentication architecture functionality is transferred to a personal computer, i.e., the bootstrapping happens in the personal computer. In generic authentication architecture respect, only network application function specific key generation is done in the mobile terminal. In this embodiment, a new messaging protocol between a user equipment mobile terminal 602 and a user equipment personal computer 604 is provided. The messaging protocol 600 of the current embodiment of the invention is illustrated in FIG. 6. The general principle of the messaging protocol of the invention is that a server continually runs in the user equipment mobile terminal 602 monitoring for requests from proximity devices, such as a personal computer 604, laptop, handheld computer, or other device capable of processing and communication tasks. The process of monitoring and receiving a request is illustrated as step 610 in FIG. 6. If a request is received, the user equipment mobile terminal 602 generally responds with a proper response at step 612. The protocol of the present invention suggests two request-response messages to aid the completion of bootstrapping security credentials. In the first message, the user equipment personal computer 604 asks for the identity and the BSF server 606 address. With these parameters, the user equipment personal computer 604 starts an HTTP-Digest-AKA protocol with the BSF server 606, as illustrated in step 614. As part of this protocol, the BSF challenges the user equipment personal computer 604 using a random number (RAND) and an authentication token (AUTN), as illustrated in step 616. In response to the challenge, the user equipment personal computer 604 sends a second request to the UEMT 602, as illustrated in step 618, passing the RAND and the AUTN received from the BSF server 606. In response to the second request, the user equipment personal computer 604 receives the required parameters, i.e., the expected response (RES) for HTTP Digest AKA, as illustrated at step 620. In step 620, the identity is generally not needed to be sent, as it was sent in the first response (IMPI). The response is used as the password for HTTP-digest-AKA response for the step 622. In step 622, the user equipment personal computer 604 send the HTTP-digest-AKA response the BSF 606 containing HTTP-digest-AKA challenge response that has been calculated using the RES. The BSF will validate the response, and generate the master GBA credentials (BTID, Ks). In step 624, the BSF 606 send the acknowledgement of successful bootstrapping session creation with the new BTID and the key lifetime associated with this bootstrapping session. In step 626, the user equipment personal computer 604 sends the received BTID, key lifetime, and additional authentication-info parameters to the UEMT 602. The UEMT will generate the master GBA credentials (BTID, Ks) and store them together with the key lifetime. In step 628, the user equipment mobile terminal indicates success or failure of the procedure to the user equipment personal computer. The third response illustrated in step 628 also may contain the key material to be used with the network application function. In this case, the user equipment mobile terminal has also received the network application function identifier (NAF_ID) in step 626 that is used to generate the network application function specific key material (Ks_NAF). In order to generate key material for other network application functions, the user equipment personal computer makes an additional request in step 630 that contains another network application function identity. The user equipment mobile terminal 602 generates the key material (Ks_NAF) for this particular network application function in step 632. The user equipment mobile terminal may get the acceptance from the user before responding to these messages from the proximity devices, which is the user equipment mobile terminal 602 in the present exemplary embodiment. The acceptance may be an informative text with OK-Cancel or a PIN to be entered to grant the permission, or another form us user authorization that is express, unless the express authorization is waived by the user, in a preferences setting, for example. With the responses, the user equipment personal computer 604 gets from user equipment mobile terminal 602, it will carry out the successful HTTP-digest-AKA protocol, and then use the key material for authentication to any network application function. Since the cellular authentication parameters that are used inside HTTP-Digest-AKA protocol are never sent outside the user equipment mobile terminal, the described procedures provide higher security of the universal subscriber identity module procedures.

The second response illustrated in step 620 also may contain the key material to be used with the network application function. In this case, the user equipment mobile terminal has also received the network application function identity (NAF_ID) in step 618 that is used to generate the network application function specific key material (Ks_NAF). In order to generate key material for other network application functions, the user equipment personal computer makes an additional request in step 626 that contains another network application function identity. The user equipment mobile terminal generates the key material for this particular network application function in step 628. The user equipment mobile terminal will get the acceptance from the user before responding to these messages from the proximity devices, which is the user equipment mobile terminal 602 in the present exemplary embodiment. The acceptance may be an informative text with OK-Cancel or a PIN to be entered to grant the permission, or another form us user authorization that is express, unless the express authorization is waived by the user, in a preferences setting, for example. With the responses, the user equipment personal computer 604 gets from user equipment mobile terminal 602, it will carry out the successful HTTP-digest-AKA protocol, and then use the key material for authentication to any network application function. Since the cellular authentication parameters that are used inside HTTP-Digest-AKA protocol are never sent outside the UEMT, the security of the universal subscriber identity module.

Certain embodiments of the invention are configured such that the user does not need to configure the IP stack setup between the user equipment personal computer 604 and the user equipment mobile terminal 602; and the security of the universal subscriber identity module generated authentication vectors (from the user equipment mobile terminal) is guaranteed, as the authentication vectors never leave the user equipment mobile terminal in their original form. Rather, only the network application function specific generic bootstrapping architecture credentials are given to the user equipment personal computer 604. If the user equipment personal computer implemented the authentication key agreement procedures itself, i.e., HTTP Digest AKA or EAP/AKA, then the authentication vector from the user equipment mobile terminal 602 would have to be transmitted to the user equipment personal computer, which presents a significant security risk.

With this protocol, essentially any application in the user equipment personal computer can take advantage of very well defined generic authentication architecture mechanisms provided by the user equipment mobile terminal. The operator of the user equipment mobile terminal has the ability to control the services that are used from the user equipment personal computer as a result of using the generic authentication architecture. Also, use of the generic authentication architecture in split terminal applications harmonizes the application server functionality, as the generic authentication architecture would be used from both the user equipment mobile terminal and the user equipment personal computer environment.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
    authenticating, with a mobile terminal including an identity module, to a service provider to obtain generic bootstrapping architecture credentials specific to the service provider using only authentication information provided from the identity module in the mobile terminal;
    transferring the generic bootstrapping architecture credentials specific to the service provider from the mobile terminal via a local link to a personal computer, wherein a communication between the mobile terminal and the personal computer is established via a generic authentication server architecture component on the mobile terminal and a generic authentication client architecture component on the personal computer, wherein the generic bootstrapping architecture credentials specific to the service provider are based upon at least one parameter representative of a universal subscriber identity module vector contained in the identity module of the mobile terminal;
    attempting, by the personal computer, to access the service provider;
    receiving an authentication request in the personal computer from the service provider in response to the access attempt; and
    querying, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein querying further comprises:
        sending a message from the generic authentication client architecture component in the personal computer to the generic authentication server architecture component in the mobile terminal containing an identification for the service provider;
        requesting, with the generic authentication server architecture component in the mobile terminal, from a bootstrapping server function, to establish the credentials;
        establishing the generic bootstrapping architecture credentials between the bootstrapping server function and the generic authentication server architecture component in the mobile terminal; and
        sending the credentials from the generic authentication server architecture component in the mobile terminal to the generic authentication client architecture component in the personal computer.

2. The method of claim 1, wherein the identity module comprises a universal subscriber identity module.

3. The method of claim 1, wherein the service provider comprises a network application function.

4. The method of claim 1, wherein the authentication request comprises a public key cryptography standard number ten request, and the credentials comprise a subscriber certificate.

5. The method of claim 1, wherein transferring the credentials further comprises prompting a user of the mobile terminal for approval to transfer the credentials to the personal computer and transferring the credentials after receiving the approval from the user.

6. The method of claim 1, wherein the credentials comprise a bootstrapping transaction identifier and a network application function specific shared secret.

7. The method of claim 6, wherein the bootstrapping transaction identifier and a network application function specific shared secret comprise a username and a network application function specific key material.

8. The method of claim 1, wherein the credentials comprise master credentials that include a username and a password.

9. The method of claim 1, wherein transferring comprises using a wireless communication medium.

10. A method, comprising:
    determining network application function specific generic bootstrapping architecture credentials are needed for an application running on a computing device comprising a personal computer;
    requesting, by the application and through a generic bootstrapping architecture application programming interface that incorporates a wireless communication medium, the generic bootstrapping architecture credentials from a mobile terminal, wherein a communication between the mobile terminal and the personal computer is established via a generic authentication server architecture component on the mobile terminal and a generic authentication client architecture component on the personal computer, wherein the network application function specific generic bootstrapping architecture credentials are based upon at least one parameter representative of a universal subscriber identity module vector contained in the mobile terminal;
    bootstrapping by the mobile terminal with a bootstrapping server function to establish a master generic bootstrapping architecture credentials using only authentication information provided from the identity module in the mobile terminal;
    transmitting the network application function specific generic bootstrapping architecture credentials from the mobile terminal to the a generic bootstrapping architecture application programming interface, which transmits the network application specific generic bootstrapping architecture credentials to the application running on the personal computer;
    attempting, by the application running on the personal computer, to access a service provider;
    receiving an authentication request in the personal computer from the service provider in response to the access attempt; and
    querying, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein querying further comprises:
        sending a message from the generic authentication client architecture component in the personal computer to the generic authentication server architecture component in the mobile terminal containing an identification for the service provider;
        requesting, with the generic authentication server architecture component in the mobile terminal, from a bootstrapping server function, to establish the credentials;
        establishing the generic bootstrapping architecture credentials between the bootstrapping server function and the generic authentication server architecture component in the mobile terminal; and sending the credentials from the generic authentication server architecture component in the mobile terminal to the generic authentication client architecture component in the personal computer.

11. The method of claim 10, wherein requesting further comprises authorizing, by a user of the mobile terminal, transmitting of the network application function specific generic bootstrapping architecture credentials.

12. The method of claim 10, further comprising determining if a preexisting bootstrapping session is active, and sending the network application function specific generic bootstrapping architecture credentials from the pre-existing bootstrapping session if a session is determined to be active.

13. The method of claim 10, wherein the network application function specific generic bootstrapping architecture credentials are based upon an identification of the network application function.

14. The method of claim 13, wherein the universal subscriber identity module vector remains in the mobile terminal and is secure from outside view.

15. An apparatus, comprising:
an authenticator configured to authenticate a computing device, wherein a universal subscriber identity module of a mobile terminal is configured to contain a shared secret, and the computing device comprising a personal computer is in communication with the mobile terminal and is configured to use a network application function that requires credentials; and
a bootstrapping server function module in communication with the mobile terminal, the bootstrapping server function module being configured to establish master generic bootstrapping architecture credentials with the mobile terminal using only authentication information provided from the identity module in the mobile terminal, and to generate and transmit generic bootstrapping architecture credentials specific to the network application function to the network application function upon receiving a request for credentials from the network application function, wherein a communication between the mobile terminal and the personal computer is established via a generic authentication server architecture component on the mobile terminal and a generic authentication client architecture component on the personal computer:
wherein the mobile terminal is configured to cause a generation and transfer of the generic bootstrapping architecture credentials specific to the network application function to the personal computer upon receiving a request for credentials from the personal computer for use in accessing the network application function;
wherein the personal computer is configured to:
attempt to access the service provider;
receive an authentication request from the service provider in response to the access attempt; and
query, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein query further causes the personal computer to:
send a message from the generic authentication client architecture component in the personal computer to the generic authentication server architecture component in the mobile terminal containing an identification for the service provider;
request, with the generic authentication server architecture component in the mobile terminal, from a bootstrapping server function, to establish the credentials;
establish the generic bootstrapping architecture credentials between the bootstrapping server function and the generic authentication server architecture component in the mobile terminal; and
send the credentials from the generic authentication server architecture component in the mobile terminal to the generic authentication client architecture component in the personal computer.

16. The apparatus of claim 15, wherein the mobile terminal comprises a cellular telephone and wherein the computing device comprises a personal computer.

17. The apparatus of claim 16, wherein the cellular telephone and the personal computer each have a wireless communication therein, the respective wireless communication devices being configured to communicate with each other to transmit a request for the credentials to the cellular phone from the personal computer and to transmit granted credentials from the cellular phone to the personal computer.

18. An apparatus, comprising:
determining means for determining generic bootstrapping architecture credentials needed for an application running on a computing device comprising a personal computer and requesting, by the application and through a generic bootstrapping architecture application programming interface that incorporates a wireless communication medium, the generic bootstrapping architecture credentials from a mobile terminal, wherein a communication between the mobile terminal and the personal computer is established via a generic authentication server architecture component on the mobile terminal and a generic authentication client architecture component on the personal computer, wherein the generic bootstrapping architecture credentials are based upon at least one parameter representative of a universal subscriber identity module vector contained in the mobile terminal;
bootstrapping means for bootstrapping the mobile terminal with a bootstrapping, server function to establish the bootstrapping architecture credentials using only authentication information provided from the identity module in the mobile terminal, which are transmitted to the application running on the personal computer from the mobile terminal; and
processing means for processing, by the application running on the personal computer, the bootstrapping architecture credentials to run the application, wherein the processing means further configures the personal computer to:
attempt to access the service provider;
receive an authentication request from the service provider in response to the access attempt; and
query, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein query further causes the personal computer to:
send a message from the generic authentication client architecture component in the personal computer to the generic authentication server architecture component in the mobile terminal containing an identification for the service provider;

request, with the generic authentication server architecture component in the mobile terminal, from a bootstrapping server function, to establish the credentials;

establish the generic bootstrapping architecture credentials between the bootstrapping server function and the generic authentication server architecture component in the mobile terminal; and send the credentials from the generic authentication server architecture component in the mobile terminal to the generic authentication client architecture component in the personal computer.

19. An apparatus, comprising:

authenticating means for authenticating, with a mobile terminal, using only authentication information provided from an identity module in the mobile terminal to a service provider with the identity module associated with the mobile terminal to obtain generic bootstrapping architecture credentials specific to the service provider;

transferring means for transferring the generic bootstrapping architecture credentials specific to the service provider from the mobile terminal to a personal computer, wherein a communication between the mobile terminal and the personal computer is established via a generic authentication server architecture component on the mobile terminal and a generic authentication client architecture component on the personal computer, wherein the generic bootstrapping architecture credentials specific to the service provider are based upon at least one parameter representative of a universal subscriber identity module vector contained in the mobile terminal; and accessing means for accessing the service provider with the personal computer using the generic bootstrapping architecture credentials transferred from the mobile terminal, wherein the accessing means causes the personal computer to:

attempt to access the service provider;

receive an authentication request from the service provider in response to the access attempt; and query, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein query further causes the personal computer to:

send a message from the generic authentication client architecture component in the personal computer to the generic authentication server architecture component in the mobile terminal containing an identification for the service provider;

request, with the generic authentication server architecture component in the mobile terminal, from a bootstrapping server function, to establish the credentials;

establish the generic bootstrapping architecture credentials between the bootstrapping server function and the generic authentication server architecture component in the mobile terminal; and send the credentials from the generic authentication server architecture component in the mobile terminal to the generic authentication client architecture component in the personal computer.

20. A system, comprising:

a mobile terminal in communication with a personal computer, wherein the communication between the mobile terminal and the personal computer is established via a generic authentication server architecture component on the mobile terminal and a generic authentication client architecture component on the personal computer; and a bootstrapping security function operating on the mobile terminal in communication with the generic authentication architecture server component;

wherein the generic authentication architecture server component is configured to conduct bootstrapping with the bootstrapping security function to generate using only authentication information provided from the identity module in the mobile terminal and transmit a generic bootstrapping architecture credential to the generic authentication architecture client in the personal computer for use in accessing a network application function, wherein the generic bootstrapping architecture credentials are based upon at least one parameter representative of a universal subscriber identity module vector contained in the mobile terminal;

wherein the personal computer further:

attempts to access the service provider;

receives an authentication request from the service provider in response to the access attempt; and query, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein query further causes the personal computer to:

send a message from the generic authentication client architecture component in the personal computer to the generic authentication server architecture component in the mobile terminal containing an identification for the service provider;

request, with the generic authentication server architecture component in the mobile terminal, from a bootstrapping server function, to establish the credentials;

establish the generic bootstrapping architecture credentials between the bootstrapping server function and the generic authentication server architecture component in the mobile terminal; and send the credentials from the generic authentication server architecture component in the mobile terminal to the generic authentication client architecture component in the personal computer.

21. An apparatus, comprising:

a determiner configured to determine generic bootstrapping architecture credentials needed for an application running on a computing device, and to request, by the application and through a generic bootstrapping architecture application programming interface that incorporates a wireless communication medium, the generic bootstrapping architecture credentials using only authentication information provided from the identity module in the mobile terminal from a mobile terminal, wherein a communication between the mobile terminal and a personal computer is established via a generic authentication server architecture component on the mobile terminal and a generic authentication client architecture component on the personal computer, wherein the generic bootstrapping architecture credentials are based upon at least one parameter representative of a universal subscriber identity module vector contained in the mobile terminal;

a processor configured to bootstrap the mobile terminal with a bootstrapping server function to establish the bootstrapping architecture credentials, which are transmitted to the application running on the computing device from the mobile terminal, and to process, by the application running on the computing device, the bootstrapping architecture credentials to run the application;
wherein the application running on the computing device causes the computing device to:
attempt to access the service provider;
receive an authentication request from the service provider in response to the access attempt;
query, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein query further causes the personal computer to:
send a message from the generic authentication client architecture component in the personal computer to the generic authentication server architecture component in the mobile terminal containing an identification for the service provider;
request, with the generic authentication server architecture component in the mobile terminal, from a bootstrapping server function, to establish the credentials;
establish the generic bootstrapping architecture credentials between the bootstrapping server function and the generic authentication server architecture component in the mobile terminal; and
send the credentials from the generic authentication server architecture component in the mobile terminal to the generic authentication client architecture component in the personal computer.

22. An apparatus, comprising:
an authenticator configured to authenticate, with a mobile terminal, to a service provider with an identity module associated with the mobile terminal to obtain credentials specific to the service provider using only authentication information provided from the identity module in the mobile terminal;
a transmitter configured to transmit the credentials specific to the service provider from the mobile terminal to a personal computer, wherein a communication between the mobile terminal and the personal computer is established via a generic authentication server architecture component on the mobile terminal and a generic authentication client architecture component on the personal computer, wherein the credentials specific to the service provider are based upon at least one parameter representative of a universal subscriber identity module vector contained in the mobile terminal; and
an accessor configured to access the service provider with the personal computer using the credentials transferred from the mobile terminal, wherein the accessor causes the personal computer to:
attempt to access the service provider;
receive an authentication request from the service provider in response to the access attempt;
query, with the generic authentication client architecture component in the personal computer, the generic authentication server architecture component in the mobile terminal for the generic bootstrapping architecture credentials, wherein the local link comprises one or more of a cable, an infrared connection, and a wireless connection, wherein query further causes the personal computer to:
send a message from the generic authentication client architecture component in the personal computer to the generic authentication server architecture component in the mobile terminal containing an identification for the service provider;
request, with the generic authentication server architecture component in the mobile terminal, from a bootstrapping server function, to establish the credentials;
establish the generic bootstrapping architecture credentials between the bootstrapping server function and the generic authentication server architecture component in the mobile terminal; and
send the credentials from the generic authentication server architecture component in the mobile terminal to the generic authentication client architecture component in the personal computer.

23. The apparatus of claim 22, wherein the identity module comprises a universal subscriber identity module.

24. The apparatus of claim 22, wherein the service provider comprises a network application function.

25. The apparatus of claim 22, wherein the transmitter is configured to transmit the credentials and to prompt a user of the mobile terminal for approval to transfer the credentials to the personal computer and transmit the credentials after receiving the approval from the user.

26. The apparatus of claim 22, wherein the credentials comprise a bootstrapping transaction identifier and a network application function specific shared secret.

27. The apparatus of claim 22, wherein the credentials comprise master credentials that include a username and a password.

28. The apparatus of claim 22, wherein the transmitter is configured to transmit the credentials using a wireless communication medium.

* * * * *

UNITED STATES PATENT AND TRADEMARK OFFICE
CERTIFICATE OF CORRECTION

| | | |
|---|---|---|
| PATENT NO. | : 8,543,814 B2 | Page 1 of 1 |
| APPLICATION NO. | : 11/328155 | |
| DATED | : September 24, 2013 | |
| INVENTOR(S) | : Laitinen et al. | |

It is certified that error appears in the above-identified patent and that said Letters Patent is hereby corrected as shown below:

In the Specification:

In Column 5, Line 3, delete "identify" and insert -- identity --, therefor.

In the Claims:

In Column 14, Line 38, in Claim 10, delete "the a" and insert -- the --, therefor.

In Column 15, Line 10, in Claim 12, delete "preexisting" and insert -- pre-existing --, therefor.

Signed and Sealed this
Sixteenth Day of September, 2014

Michelle K. Lee
*Deputy Director of the United States Patent and Trademark Office*